Oct. 13, 1970    W. C. DEE    3,533,664
FLUID BEARING
Filed June 14, 1968    2 Sheets-Sheet 1

INVENTOR:
WILLIAM C. DEE

Oct. 13, 1970  W. C. DEE  3,533,664
FLUID BEARING
Filed June 14, 1968  2 Sheets-Sheet 2

INVENTOR:
WILLIAM C. DEE

United States Patent Office 3,533,664
Patented Oct. 13, 1970

3,533,664
FLUID BEARING
William Colin Dee, 2 Frederica Road,
Bournemouth, Hampshire, England
Filed June 14, 1968, Ser. No. 737,005
Claims priority, application Great Britain, June 16, 1967, 27,904/67
Int. Cl. F16c *17/16*
U.S. Cl. 308—9      9 Claims

ABSTRACT OF THE DISCLOSURE

A fluid bearing wherein one or more fluid feed holes opening into a bearing gap defined between two relatively movable bearing members are each constituted by a slot defined between respective faces of each of two mutually locked elements forming part of one of the bearing members, the direction of the slot being inclined such that the bearing fluid is introduced into the bearing gap in a direction counter to the direction of rotation of the other bearing member.

---

This invention relates to fluid journal and thrust bearings, and is concerned with overcoming problems of manufacture of such bearings, and instabilities encountered in such journal bearings.

In my copending United States patent application Ser. No. 557,231 mention is made that one of the main problems hitherto encountered in the manufacture of this type of bearing has been the production of extremely small feed holes in one bearing member for the supply of fluid under pressure to the annular bearing gap between the bearing members. Such holes may need to be as small as, for instance, about five thousandths of an inch or less in diameter and in view of the practical difficulties involved in drilling them it has hitherto been necessary to reduce the thickness of the bearing member to such an extent that its inherent rigidity has been impaired.

It is known that reduction of diameter of the fluid feed holes has a direct relation to the resultant "stiffness" of the bearing, and consequently the tendency has been to use smaller diameter feed holes and smaller bearing gaps, both to increase the "stiffness" of the bearing and to conserve the power consumed in pumping fluid to the bearing.

In accordance with the invention claimed in my copending United States patent application referred to above, there is provided a fluid bearing wherein one or more fluid feed holes opening into a bearing gap defined between two relatively movable bearing members are constituted by slots defined between respective faces of each of two mutually locked elements of one of the bearing members.

The object of the present invention is to provide a further improvement whereby greater stability of the bearing and raising of the threshold speed for "half-speed whirl" are obtained.

According to the present invention there is provided a fluid bearing wherein three or more fluid feed holes opening into a bearing gap defined between two relatively movable bearing members are each constituted by a slot defined between respective faces of each of two mutually locked elements forming part of one of the bearing members, the direction of the slot being inclined such that the bearing fluid is introduced into the bearing gap in a direction counter to the direction of rotation of the other bearing member.

The or each slot may have its axis in a radial plane of the axis of rotation and forming a tangent to a circle centered on the axis of rotation, and in a preferred embodiment four such slots are provided with their respective axes each at 90° to the axis of the neighbouring slots.

The slots may be provided by forming recesses in a radial end face of a second element of a bearing member and then butting that recessed face against a plane radial end face of a first mutually locked element of the same bearing member.

However, three or more slots can be formed, depending on the bore diameter of the bearing.

The recesses may conveniently be formed in the radial end face of one such element by milling or grinding across the end face so as to make a shallow cut having its median line offset from the axis of the second element.

In a preferred embodiment, one of the bearing members includes a first element which has a plane radial end face and a coaxial bore within which is seated the external periphery of the second element having its neighbouring end face recessed and butted against the plane radial end faces of the first element, the external periphery of the second element when required being cut away so as to provide one or more passages for flow of bearing fluid to a thrust bearing gap defined between another radial end face of the second element and a radial end face of a thrust bearing member.

The flow of the bearing fluid to the thrust bearing gap may take place through an annular channel defined between an outside periphery of the second element and an inside periphery of a third element of the first bearing member.

In order that the nature of the invention may be readily ascertained, two embodiments of fluid bearing device in accordance therewith are hereinafter particularly described with reference to the figures of the accompanying drawing, wherein.

Figure 1:
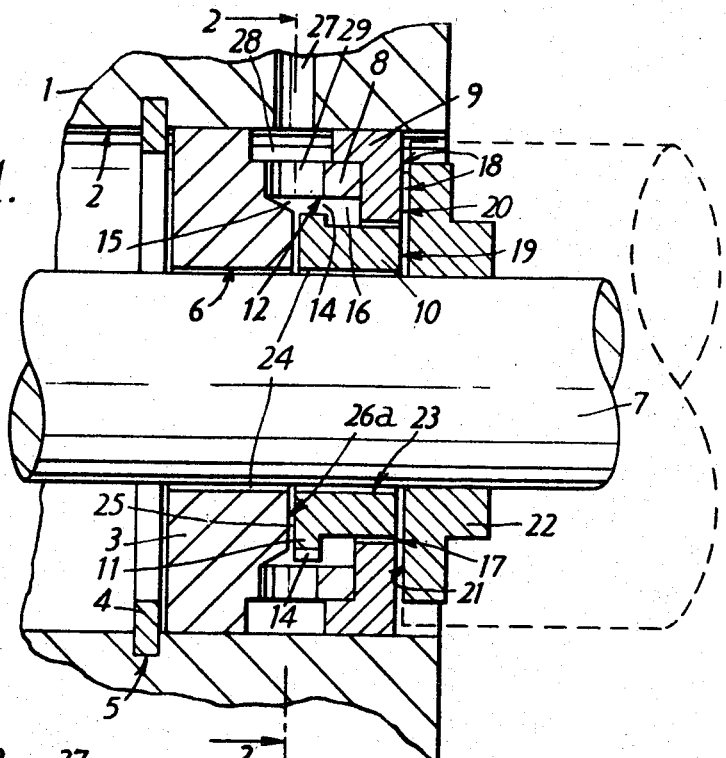
FIG. 1 is a central axial section a first embodiment of the device.

In this drawing a stationary structure 1 has a bore 2 within which is disposed a first element 3 of one member of the bearing, said element 3 being secured against axial movement, in one direction, by a circlip 4 or other similar device seated in an annular recess 5. The element 3 has an axial bore 6 within which is disposed a rotor shaft 7. The element 3 also comprises a short axial tube 8 which seats at its free end within a ring 9 disposed in the bore 2, said ring constituting a third element of the same bearing member.

Figure 3:
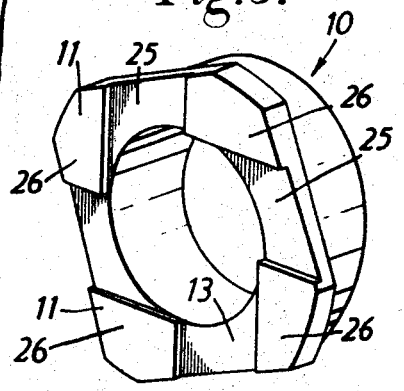
FIG. 3 is an axial elevation, seen in the direction of the arrow III in FIG. 1, of a second element of one bearing member.

Disposed within the tube 8 and the ring 9 there is an annulus 10, seen in end elevation in FIG. 3, constituting a second element of the bearing member. This annulus has, at its left-hand end in FIG. 1, a collar 11 the external periphery of which is an exact fit within a coaxial bore 12 of the tube 8. This collar is machined away at four symmetrical positions so as to provide four chordal flats 13, so that when the collar is positioned within the tube 8, there are defined between the collar and tube a set of four symmetrically positioned passages 14 through which pressurised bearing supply fluid can pass from a first annular feed channel 15 to a second annular feed channel 16.

Another external periphery of the annulus 10 is of slightly smaller diameter than the inside periphery of the ring 9, whereby there is defined between them an annular axial-flow channel 17 leading to a thrust bearing gap 18 defined between the radial end faces 19 and 20 respectively of the annulus 10 and the ring 9, and a radial end face 21 of a thrust ring 22 secured on the rotor shaft 7 constituting the other bearing member. The end face 21 of the thrust ring 22 could be replaced by a radial end face of an integral shoulder formed on the shaft 7.

Figure 2:
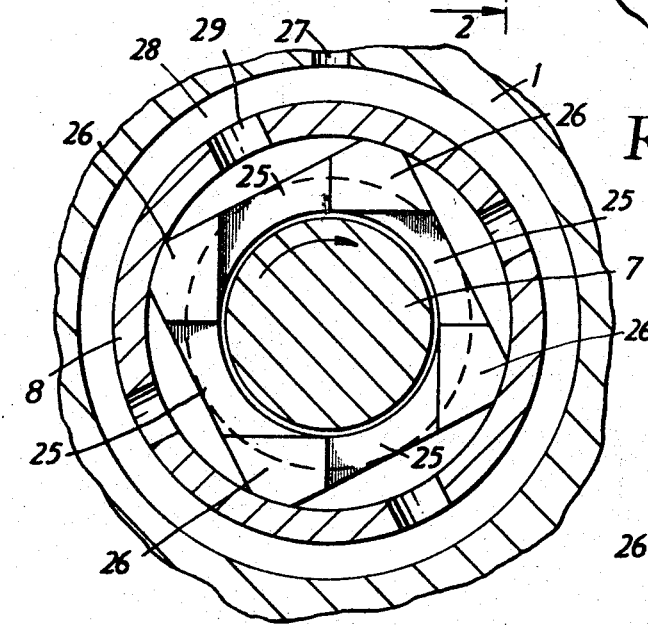
FIG. 2 is a radial section taken on the line II—II of FIG. 1.

The inside periphery 23 of the annulus 10 is of the same diameter as the bore 6 of the body 3 and between those two surfaces and the outside periphery of the shaft 7 there is defined a journal bearing gap 24. To feed bearing fluid to this journal bearing gap 24, from the annular feed channel 15, there are provided four slots formed as follows:

The left-hand end face (in FIG. 1 of this drawing) of the annulus 10 is milled or ground across normal to its axis, in this embodiment half the inside diameter of the annulus, the cuts being made along lines which are offset to the axis, thereby to provide the four tangential recesses 25 seen in FIG. 2. These recesses are of relatively very shallow depth and when the end face of the annulus (that is to say the remaining intermediate lands 26 thereof) is butted up axially against the plane radial end face 26a of the body 3 there are defined between them a set of four tangential slots forming a communication between the annular feed channel 15 and the journal bearing gap 24. The direction of rotation of the shaft 7 in the bearing is shown by the arrow in FIG. 2, and it will be seen from that figure that the four tangential slots will direct the fluid flow, passing inwardly to the journal bearing gap, in a direction which is counter to the direction of rotation of the shaft.

Fluid under pressure is supplied to the device through a port 27 which feeds an annular channel 28 from which a series of radial bores 29 in the tube 8 form a communication to the annular feed channel 15.

The common fluid feed to the annular channel 15 accordingly passes (i) to the journal bearing gaps 24 via the tangential slots, and (ii) to the thrust bearing gap 18 via the annular passage 17.

The positioning of the slots so as to direct the flow, to the journal bearing gap, counter to the direction of rotation of the shaft 7 and thus also counter to the direction in which the fluid contained in the journal bearing gap tends to be dragged round by the shaft, provides increased stability because the direction of the fluid entering the bearing gap contrary to the direction of the shaft rotation follows a more axial flow pattern, as opposed to the circumferential flow pattern for jet inlets. It is found in practice that this construction serves to increase the threshold speed at which "half-speed whirl" tends to occur, thereby accordingly increasing the speed range over which the rotating component, e.g., the shaft 7, may operate after having passed through the first critical vibration inversion speed.

Figure 4:
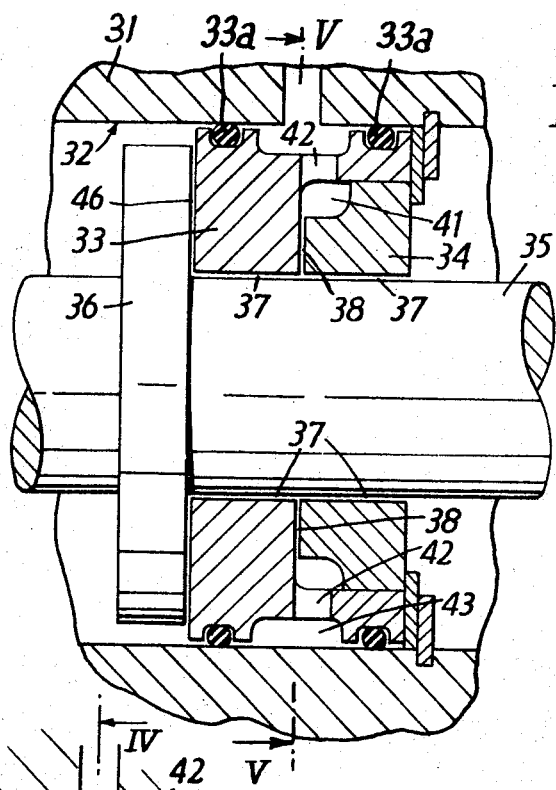
FIGS. 4, 5 and 6 are similar views of a second embodiment.
Figure 5:
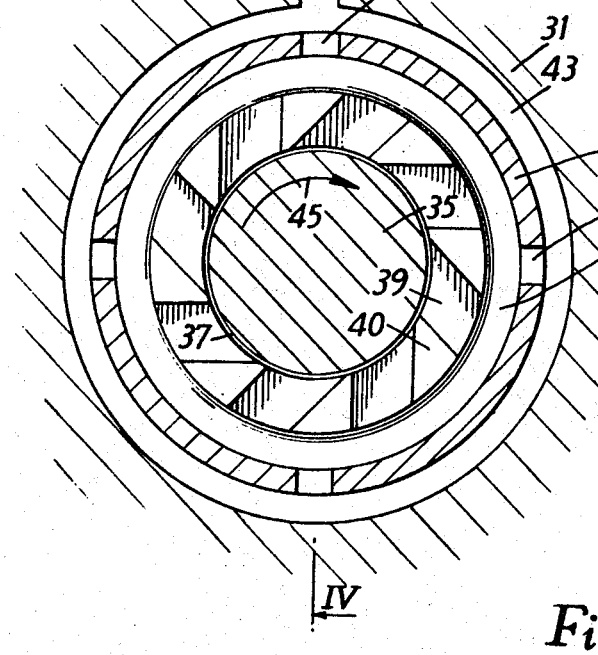
Figure 6:
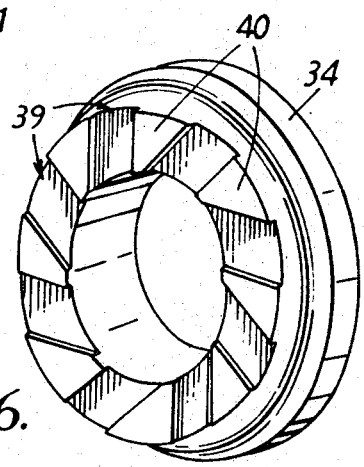

Referring to FIGS. 4, 5 and 6, there is seen a second embodiment wherein a stationary structure 31 has a bore 32 receiving a stationary bearing member constituted by two elements 33 and 34 mounted by O-rings 33a. In the bore of the stationary bearing member there is disposed a rotor shaft 35 with a thrust disc 36. A fluid bearing gap 37 is fed by a plurality of tangential passages 38 each formed by milling across an end face of the element 34 to form eight tangential recesses 39 (see FIG. 6), and then butting the remaining lands 40 against an end face of the element 33. The passages 38 are fed from an annular chamber 41 receiving fluid through a plurality of radial holes 42 leading from an annular feed passage 43 defined by the structure 31, the elements 33, and the two O-rings 33a. An inlet passage 44 feeds the passage 43. Arrow 45 shows the direction of rotation of the shaft 35. The thrust bearing gap 46 defined between the thrust disc and the element 33 is fed with fluid by bleed from the adjacent end of the journal bearing gap 37.

I claim:

1. A fluid bearing comprising first and second bearing members relatively rotatable about an axis of rotation and serving to define between them a fluid bearing gap, one of said bearing members including first and second elements and means locking said first and second elements stationarily one with respect to the other, said first and second elements defining between them a plurality of shallow slots, the depth dimension of which is parallel to the bearing gap, separated by spacers, and said slots having their respective longitudinal median lines disposed tangentially to the bearing axis at angularly spaced intervals about the bearing gap, said plurality of slots extending longitudinally as far as and opening into the bearing gap, said one bearing member including passage means for feeding bearing fluid to the bearing gap.

2. A fluid bearing, as claimed in claim 1, wherein each such slot has its axis in a radial plane of the surface at which it opens, and forming a tangent to a circle coaxial with said surface.

3. A fluid bearing, as claimed in claim 1, wherein four slots have their respective axes disposed at 90° intervals about the axis of the surface into which they open.

4. A fluid bearing, as claimed in claim 1, wherein each slot is defined between respective faces of each of two mutually-locked elements forming part of said bearing member.

5. A fluid bearing, as claimed in claim 4, wherein one of said elements has a recessed radial end face and the other of said elements has a plane end face butted against said recessed end face of said one element.

6. A fluid bearing comprising first and second bearing members relatively rotatable about an axis of rotation and serving to define between them a fluid bearing gap, one of said bearing members including first and second elements and means locking said first and second elements in assembly stationarily one with respect to the other, said first element having a plane radial face, said second element having a radial face into which there is formed a plurality of parallel sided shallow recesses the depth dimension of which is parallel to the bearing gap, separated by identical symmetrical spacers and said recesses and spacers having their respective longitudinal median lines disposed tangentially to the bearing axis at equally angularly spaced intervals symmetrically about the bearing gap, said pluarlity of recesses extending longitudinally as far as the bearing gap, said plane radial face of said first element being butted against said recessed radial face of said second element thereby to define a plurality of symmetrical tangential recesses open at an end normal to the bearing gap, the sum of the respective circumferential widths of the said open end of the plurality of recesses being a major fraction of the circumference of the bearing gap at its periphery, said one bearing member including passage means for feeding bearing fluid to the bearing gap.

7. A fluid bearing comprising first and second bearing members relatively rotatable about an axis of rotation and serving to define between them a fluid bearing gap, one of said bearing members including first and second elements and means locking said first and second elements in assembly stationarily one with respect to the other, said first element having a plane radial face, said second element having a radial face butted against said plane radial face and in which there is formed tangentially to the bearing axis a plurality of axially parallel-sided shallow recesses such that bearing fluid is introduced into said bearing gap in a direction counter to the direction of rotation of one of said bearing members.

8. A fluid bearing comprising first and second bearing members relatively rotatable about an axis of rotation and serving to define between them a fluid bearing gap, one of said members including at least one intermediate element and end elements disposed one at each end of said intermediate element and means locking said intermediate element and said end elements in assembly stationarily each with respect to the others, at least one of said elements having a plane radial face butted against another element having a radial face in which there are provided a plurality of parallel-sided shallow recesses the depth dimension of which is parallel to the bearing gap and the longitudinal median line of which is tangential to the bearing gap, said recesses being separated by identical symmetrical spacers and said recesses and spacers having their respective longitudinal median lines disposed at equally angularly spaced intervals symmetrically about the bearing gap, said plurality of recesses extending longitudinally as far as the bearing gap and being open at one end normal to the bearing gap and providing fluid passage counter to the direction of rotation of the other bearing member, the sum of the respective circumferential widths of the said open end of the plurality of recesses being a major fraction of the circumference of the bearing gap, and said one bearing member including passage means for feeding bearing fluid to the bearing gap.

9. A fluid bearing comprising first and second bearing members relatively rotatable about an axis of rotation and serving to define between them a fluid bearing gap in both axial and radial planes, one of said bearing members including first, second and third elements and means locking said first, second and third elements in assembly stationarily each with respcet to the others, said first element having a plane radial face, said second element having a radial face into which there is formed a plurality of parallel-sided shallow recesses the depth dimension of which is parallel to the bearing gap and separated by identical symmetrical spacers, said recesses and spacers having their respective longitudinal median lines disposed tangentially normal to the bearing gap at equally angularly spaced intervals symmetrically about the bearing gap such that bearing fluid is introduced to the bearing gap counter to the direction of rotation of the other bearing member, the extrenal periphery of said second element being reduced such as to provide a fluid flow passage parallel to the bearing axis within the third element to feed a thrust bearing gap defined between a radial end face of said second and third elements and a radial end face of a thrust bearing member.

References Cited
UNITED STATES PATENTS 3,186,774  6/1965  Wilcox _____ 308—5
3,350,145  10/1967  Le Nabour _____ 308—122

FRED C. MATTERN, Jr., Primary Examiner